M. DE COSMO.
DIRECTION INDICATOR.
APPLICATION FILED JUNE 28, 1919.

1,432,539.

Patented Oct. 17, 1922.
3 SHEETS—SHEET 1.

Inventor
Michael de Cosmo,
By ____ Attorney

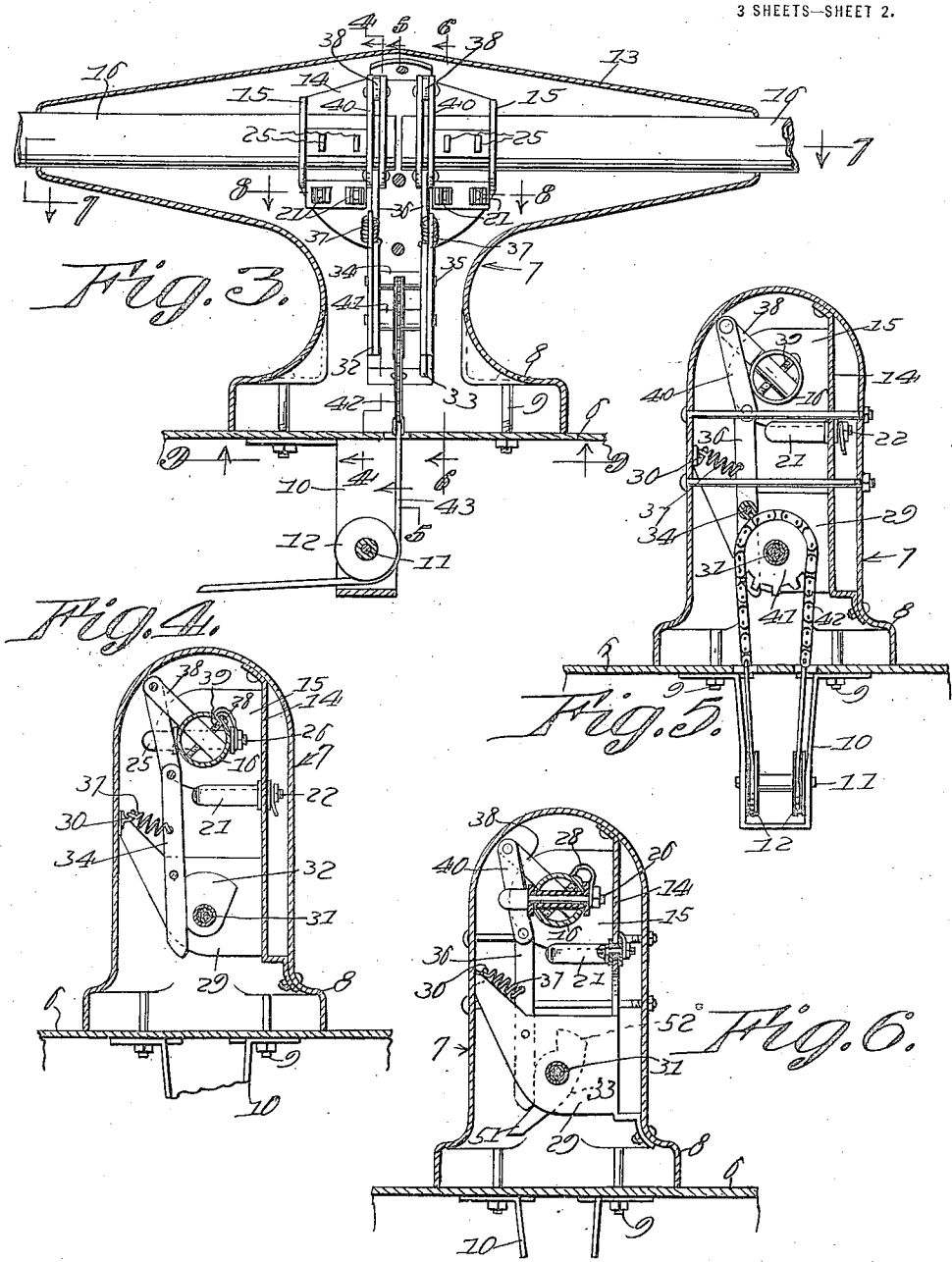

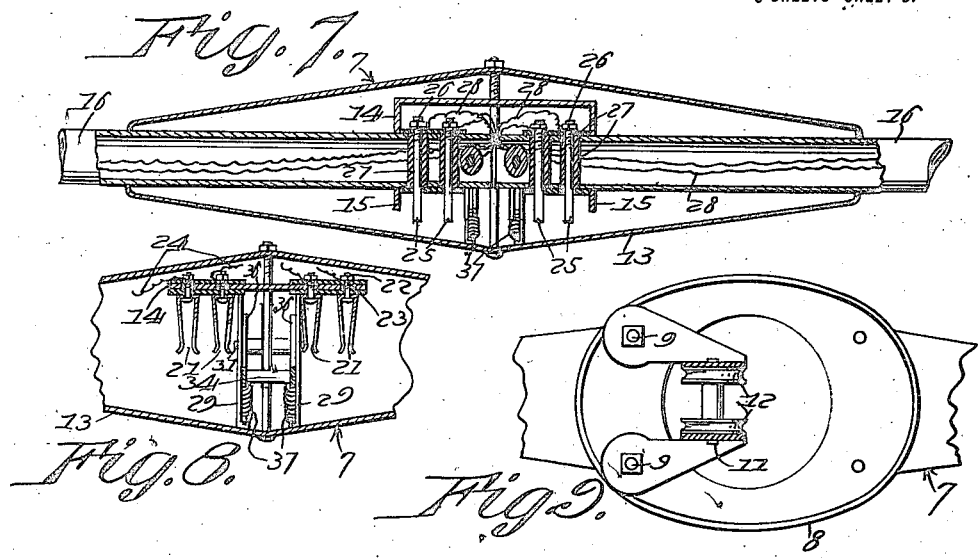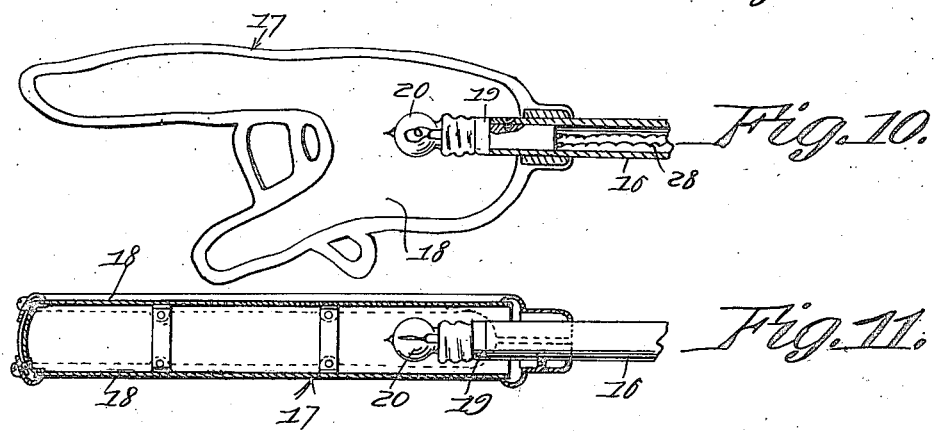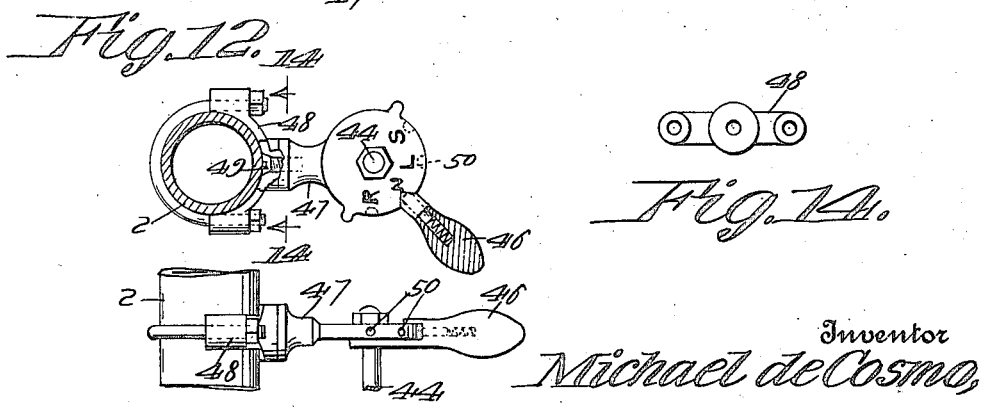

Patented Oct. 17, 1922.

1,432,539

UNITED STATES PATENT OFFICE.

MICHAEL DE COSMO, OF OAKLAND, CALIFORNIA.

DIRECTION INDICATOR.

Application filed June 28, 1919. Serial No. 307,314.

*To all whom it may concern:*

Be it known that MICHAEL DE COSMO, a citizen of the United States of America, residing at Oakland, in the county of Alameda and State of California, has invented new and useful Improvements in Direction Indicators, of which the following is a specification.

The object of the invention is to provide a device for attachment on automobiles and other vehicles so that the driver of such vehicle may indicate to those both in front of him and those to his rear the direction he purposes taking; to provide a device constituting a housing which may be mounted on the auto vehicle directly behind the hood and in front of the wind shield the housing carrying suitable signalling members observable from either side of the machine; to provide unique means attachable to the steering column and connecting with the signalling means for the operation of the latter either together or singly as desired; and to provide a device of this character which is simple in construction, durable and effective in operation, inexpensive to manufacture and which may be readily applied to various characters of auto vehicles without any modification in the latter.

In illustrating and describing the invention, a specific embodiment thereof is adhered to, but to this embodiment the invention is not to be restricted. Actual use in practice may suggest certain changes or alterations, and these the right is claimed to make, in so far as they do not deviate from the scope of the appended claims.

The same numerals of reference designate the same parts throughout the several figures of drawings, wherein:

Figure 3 is a central vertical sectional view through the housing of the signalling device.

Figure 4 is a section on the line 4—4 of Figure 3.

Figure 5 is a section on the line 5—5 of Figure 3.

Figure 6 is a section on the line 6—6 Figure 3.

Figure 7 is a section on the line 7—7 of Figure 3.

Figure 8 is a section on the line 8—8 of Figure 3.

Figure 9 is a section on the line 9—9 of Figure 3.

Figure 10 is a view partly in elevation and partly in section showing one of the signal hands.

Figure 11 is a longitudinal sectional view of the signal hand showing the manner of mounting the transparent members therein.

Figure 12 is a top plan view of the signal operating member.

Figure 13 is an elevational view of the structure shown in Figure 12.

Figure 14 is a section on the line 14—14 of Figure 12.

Figure 1:
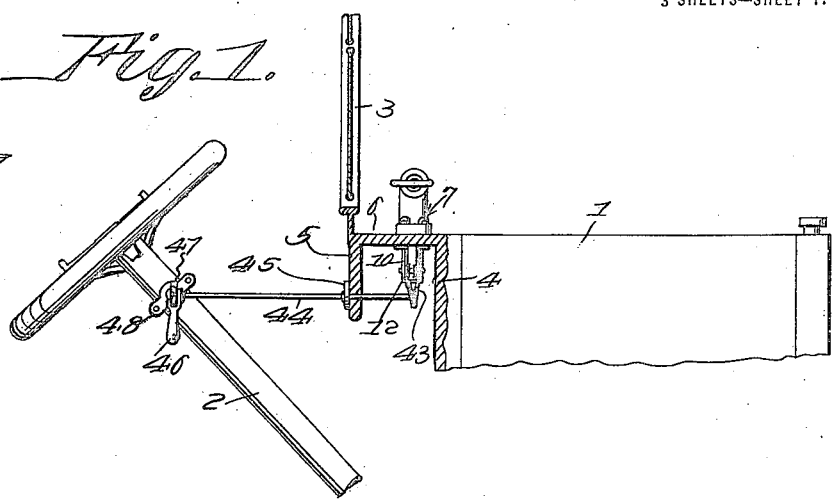
Figure 1 is a view in side elevation and partly in section of the steering column and a portion of an auto vehicle, this view showing the application of the invention.
Figure 2:
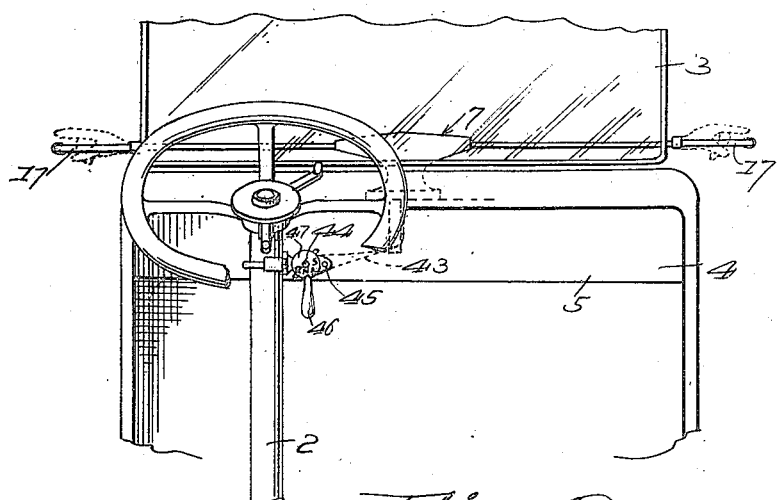
Figure 2 is an elevational view looking in the direction of the arrow "A" in Figure 1.

Referring to the drawings, in Figures 1 and 2 there is shown the manner in which the device is applied to an auto vehicle. In these figures there is shown the hood 1 of the vehicle and the steering column 2 therefor. The wind shield 3, as is usual, is mounted on the front dash 4, adjacent the depending plate 5, on which it is usual to mount the speedometer, battery instruments and other devices attendant on the operating mechanism of the vehicle. The plate 5, as is usual, is spaced from the dash 4 and on that portion 6 connecting the two the improved signalling device is mounted.

This device comprises essentially a pressed sheet steel housing 7, the housing being hollow and having a hollow base portion 8, the bottom of which is open except when the housing is attached on the plate or portion 6 which acts as a bottom therefor. Appropriate bolts 9 are provided and these bolts secure the housing to the plate 6 being passed through appropriate holes formed therein. Two of the bolts 9 besides securing the housing in position also serve as the attaching means for the pressed steel bracket 10 which is of U-shaped conformation and which carries a pintle or shaft 11 on which are rotatably mounted sheaves. The U-shaped bracket 10 is below the plate 6 and is therefore within the vehicle behind the front dash and it is so positioned that the axis of the sheaves 12 is in the direction of the length of the vehicle. These sheaves are for a purpose hereinafter appearing.

The housing 7 is formed with a hollow top portion 13 which when the housing is attached to the vehicle is transversely disposed with reference to the vehicle body, and centrally disposed within this hollow portion 13 there is carried a pressed steel bracket 14, which is riveted or otherwise suitably secured to one wall of the housing. This pressed steel bracket is formed with two ears 15, one at either side and these ears have holes formed therein which holes are aligned with holes or openings formed at the extremity of the hollow portion 13. Each ear 15 and the extremity of the housing on that side of the ear form bearings for a tube 16, these tubes being mounted for angular movement of 90 degrees in the operation of the device. The two tubes 16 project from opposite ends of the hollow portion 13 of the housing and terminate adjacent opposite sides of the vehicle on which the device is used, each tube carrying at its outer extremity a signalling hand 17, which is of hollow construction and provided with transparent plates 18 attached to it on opposite sides, the edge walls defining the hand being opaque due to the hand being made preferably of sheet metal. Further then, carrying the hand 17 at their extremities, the tubes 16 also carry lamp sockets 19 in which are attached lamps 20 illuminated preferably by an electric source of supply. The lamps 20 are positioned within the hollow hand and when the hands are disposed at vertical positions the lights are observable both from the rear and the front of the vehicle on which the device is used, but when the hands are positioned horizontally, the lamps are not observable because means is provided for depriving them of their source of light when the hands are in such horizontal positions.

Attached to the bracket 14 between the two ears 15 there are two pairs of switch clips 21, these clips being secured to the bracket by means of bolts 22 and insulated from the bracket by suitable insulating means 23. The bolts which secure the clips in place also serve to attach the ends of electric supply wires 24 which communicate with batteries or suitable source of electric supply to conduct electric current to the clips.

Carried by the interior ends of the tubes 16, there are switch blades 25 which are appropriately secured to the tubes by being formed with appropriate shanks projecting diametrically through the tubes, the shanks being threaded to receive nuts 26 which secure them and the blades in place in the tubes, suitable insulation 27 being interposed between the shanks, and blades and the nuts to insulate the blades from the tubes. The pair of blades mounted in each tube have connected therewith the electric supply wires 28, the ends of which are secured underneath the nuts 26 and these wires pass through the tubes and connect with the terminals of the lamp sockets carried in the outer ends thereof. Since the tubes are adapted for an angular movement of 90 degrees, the switch blades which are positioned for the purpose may be forced into and withdrawn from the clips 21 and since current is always available at the clips, the engagement of either pair of clips will effect the illumination of the lamp carried by that tube. The end is so positioned on the tube that when it is in horizontal position the switch blades are disengaged from the clips, and the light, therefore, in the hand is not illuminated. When the hand is moved to vertical position as it is in the operation of the device, the blades are forced in between the clip jaws and the electrical circuit illuminating the lamp is established, the light of a lamp being observable through the transparent sides of the hand.

Unique means is provided for rocking the tubular members 16 to bring the hands in the two positions mentioned above, and this means is effective for operating either tubular member or both, so that in the event the driver desires to stop he may operate both tubular members to display the signals on both sides of the machine or if he wishes to turn to the right or the left he may operate the signal on that side of the machine in the direction he purposes taking. To this end, the bracket 14 is formed with two spaced parallel ears 29 so shaped as to provide hooks 30 at their extremities. These two ears support for rocking movement therein a shaft 31, this shaft carrying the cams 32 and 33 the former standing adjacent one ear 29 and the latter adjacent the other ear. The ears 29 serve further to support between them a rod 34 the latter being formed with reduced ends 35 set in the ears and on these reduced ends there are pivotally mounted the levers 36, this pivotal connection being substantially at the centers of the lengths of the levers so that the reduced ends 35 serve as fulcrums on which the levers operate. The levers are in position to be operated by the cams 32 and 33 and two springs 37 are provided, being tensioned between the hooks 30 and appropriate eyes formed in the levers above the pivot joints 35, the cams 32 and 33 engaging the levers below the pivot joints. The levers 36 are operatively connected one to each tubular member 16, each of these tubular members carrying at its inner end an arm 38, which passes diametrically through the tubular member, and is held in place therein by a screw 39 passing also diametrically through the tubular member but in a direction at right angles to the arm. The outer or free ends of the two arms are connected with the upper ends of the levers 36 by means of links 40 arranged in pairs with the units of each pair one on either side of the arm and lever.

Since the cams 32 and 33 are designed to move the levers and thus operate the tube 16, means must be provided for moving the cams and this means comprises a sprocket wheel 41 mounted substantially at the center of shaft 31, a chain 42 being trained over the sprocket wheel. The two ends of the chain, however, connect with the ends of flexible member 43 which are preferably metal cables. These metal cables are trained one over each of the sheaves 12 and connect with a second chain trained over a sprocket similar to the sprocket 41 but carried at the outer extremity of a rod 44. This rod 44 stands normally horizontally with its length disposed in the direction of the vehicle on which the device is used, the rod passing through an appropriate hole formed in the plate 5 and being journalled in a bearing plate 45 suitably attached to the plate 5. The rod 44 at its inner extremity connects with a manually operable lever 46 which is mounted for pivotal movement on a bracket 47 secured to the steering column 2 by an appropriate clamp 48. The bracket is secured to the clamp by means of a screw 49 and it will be observed that the peculiar construction of the bracket and its attendant clamp is such that the bracket may be positioned vertically irrespective of the angle of inclination of the steering column to which the clamp 48 is attached, the screw 49 permitting the adjustment of the bracket to attain this vertical position, this being necessary since the rod 44 is horizontal and the handle 46 is moved in a vertical plane to rock the rod 44 such movement of the handle obviously resulting in the rocking of the shaft 41 for the operation of the cams 32 and 33.

The bracket 47 comprises a disk in the periphery of which are the depressions 50 and the disk on one face and opposite the depressions carries the letters "L," "N," "R" and "S," the handle 46 having a spring held pin engageable in the depressions to hold the handle opposite any one of which it may be positioned. The pin is of a character that will permit its disengagement from any of the depressions 50, by forcibly moving the handles in the direction desired.

When the pin is in the depression marked "N" the shaft 31 stands to position the cams 32 and 33 as shown in Figures 4 and 6 respectively. If now the handle be moved to permit the pin to engage the depression marked "R" the rod 44 will be rocked to cause the shaft 31 to move in an anti-clockwise direction as viewed in Figures 4 and 6. Such a movement of the shaft 31 will cause the finger 51 of the cam 33 to be wiped against the lever 36 attendant on that cam with the result that the tubular member 16 connected with that lever will be rocked to bring its attendant hand to a vertical position, this hand obviously being that on the right hand side of the machine. As has been explained before, such a rocking movement imparted to the tubular member will serve to illuminate the light carried in the hand because of the engagement effected between the switch blades and their attendant clips. The tubular member 16 and the hand on the left of the machine will, of course, remain at rest because the cam 32 upon which it is dependent for operation is moved away from its attendant lever 36.

If now the handle 46 be moved to neutral, both hands will stand in horizontal position as before explained and it is obvious that this hand must be moved to neutral before the hand on the left hand side of the machine can be operated. To effect this the handle 46 is moved to effect the engagement of the pin with a depression marked "L," when the cam 32 rocks its attendant lever 36 to operate the left-hand signal as the right-hand signal was operated but the right hand signal remains at rest because that portion, or cam element 52 of the cam 33 does not reach its attendant lever 36 when the pin is in the depression marked "R."

When it is desired to operate both signals which will be the case when the driver stops, the handle 46 is moved to permit the engagement of the pin with the depression marked "S," when the cam element 52 will engage its attendant lever 36 with the cam 32 still engaging its attendant lever and thus both tubular members and both hands will be operated for the purpose herein specified.

The invention having been described, what he claims as new and useful is:

1. In a direction indicator, the combination with an auto vehicle, of a casing disposed upon and secured to the cowl of the vehicle and provided with laterally extending signalling members adapted for angular or turning movement to dispose them in operative and in inoperative positions, a rock shaft carried in the casing and operatively connected with said members, a sprocket carried on said rock shaft, a bracket secured within the cowl below the casing, idler rollers mounted on said bracket, an operating rod journaled in the vehicle dash and provided with a sprocket at its forward extremity, an operating handle connected with the rear end of the rod, and chain sections carried on the two sprocket wheels and connected by flexible members traversing the idler rollers in the manner and for the purpose specified.

2. In a direction indicator, a housing adapted for attachment on the body of a vehicle, signalling members mounted in said housing and projecting from opposite ends thereof, said members being axially aligned and adapted for angular movement to position them in operative and inoperative positions, a rock shaft, operative connections between said rock shaft and said members whereby either or both may be operated upon the prescribed angular movements of the rock shaft, a sprocket wheel carried on said rock shaft, an operating shaft having an operating member for mounting on the steering column of the vehicle, a sprocket wheel carried on said operating shaft, chains engaged with said sprocket wheel, idler pulleys, and flexible members connecting the extremities of the chains on the rock shaft and the operating shaft and trained over said idler pulleys.

3. In a direction indicator, a housing adapted for mounting on the body of a vehicle, signalling elements adapted for angular movement to dispose them in operative and inoperative positions, said signalling elements being axially aligned and rotatably mounted in said housing from the opposite ends of which they project, a rock shaft disposed within said housing, a remote control for said rock shaft, levers pivotally mounted in said housing, cams carried on said rock shaft and engageable with said levers whereby either or both may be operated upon the prescribed angular movement of the rock shaft, and operative connections between said levers and said signalling elements.

4. In a direction indicator, a housing adapted for mounting on the body of an automobile, signalling elements journalled in said housing and axially aligned and projecting from opposite sides thereof, whereby the said elements may be disposed in operative and in inoperative positions by imparting angular movement thereto, a bracket disposed in said housing, a cam shaft journalled in said bracket, levers pivotally mounted on said bracket and engageable with cams mounted on the rock shaft, means for imparting angular movement to the rock shaft, and operative connections between said levers and said elements whereby either or both may be operated upon a prescribed angular movement of the rock shaft.

5. In a direction indicator, a housing adapted for mounting on the body of a vehicle, signalling elements journalled in said housing and axially aligned and projecting from opposite sides thereof so that angular movement imparted to them may dispose them in operative or in inoperative positions, a bracket carried in said housing, levers pivotally mounted on said bracket, a cam shaft journalled in said bracket and provided with cams, springs operatively connected with the levers to effect bearing contact of them upon the cams, the signalling elements being provided with arms, links connecting said arms with said levers, and means for imparting angular or rotary movement to said cam shaft, whereby either or both of said levers may be actuated for the corresponding actuation of the signalling elements in the manner and for the purpose specified.

In testimony whereof I affix my signature.

MICHAEL DE COSMO.